J. G. WHITESIDE.
GRIP TRUCK.
APPLICATION FILED NOV. 8, 1913.

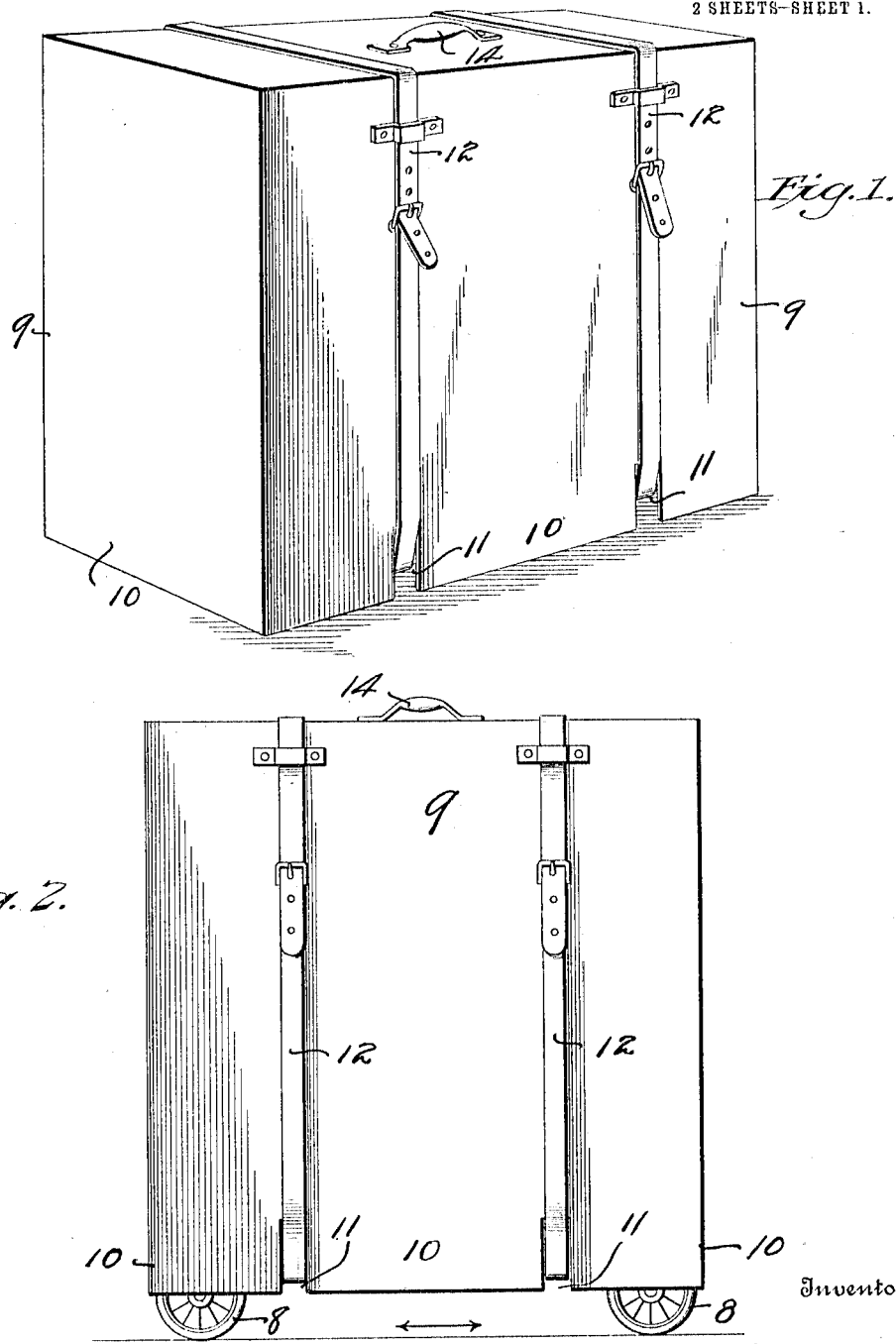

1,105,943.

Patented Aug. 4, 1914.

2 SHEETS—SHEET 2.

Witnesses

Inventor
James G. Whiteside
By W. C. Carman
Attorney

UNITED STATES PATENT OFFICE.

JAMES G. WHITESIDE, OF YOUNGSTOWN, OHIO.

GRIP-TRUCK.

1,105,943.  Specification of Letters Patent.  Patented Aug. 4, 1914.

Application filed November 8, 1913. Serial No. 799,929.

*To all whom it may concern:*

Be it known that I, JAMES G. WHITESIDE, a citizen of the United States, residing at Youngstown, in the county of Mahoning and State of Ohio, have invented certain new and useful Improvements in Grip-Trucks, of which the following is a specification.

This invention relates to the general subject of hand baggage and more particularly to that class of valises or cases employed by traveling salesmen for carrying and exhibiting samples of goods. Ordinarily, the traveling salesman's case or valise is large, cumbersome, and heavy, and the carrying and transporting of same from place to place is attended with considerable physical effort and discomfort, besides usually requiring the salesman to have his case handled as baggage in the baggage car with all the attendant risks of breakage and damage to the samples of goods which it contains. Accordingly, it is the purpose of the present invention to provide an improvement in valises or cases of the character referred to which will permit the same to be carried by the traveler as hand baggage in the passenger's coach or Pullman car, while at the same time providing the baggage with means whereby it can be conveniently and easily transported from point to point without the weight thereof being carried. That is to say, according to the present invention, it is proposed to equip a traveling salesman's case or valise with a transporting truck in such a manner that during transit on trains or cars, the truck may be entirely concealed within and housed by the case, so that the latter can be carried as ordinary hand baggage with the traveler. This obviates the requirement of all wheeled objects being carried in the baggage car. At the same time, the parts of the invention are so associated and combined that the mere act of loosening the strap or other fastening for the case, permits the cover part to be lifted sufficiently to expose the wheels of the truck for travel upon the ground or floor, thereby enabling the salesman to simply roll the case on its wheels.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which—

Figure 3:
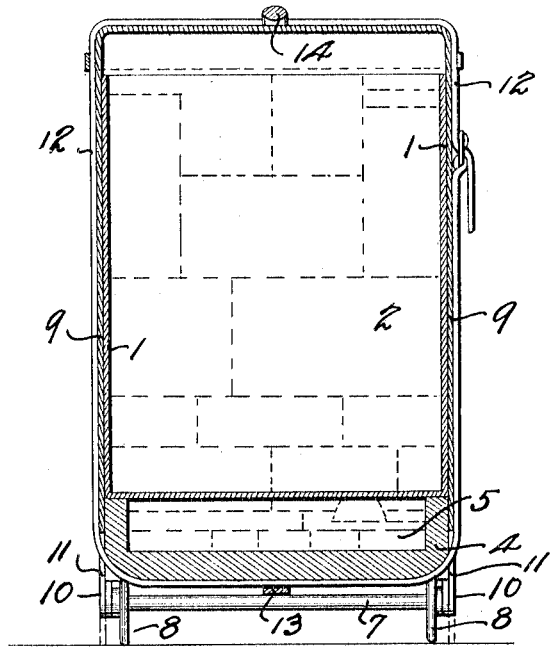
Figure 4:
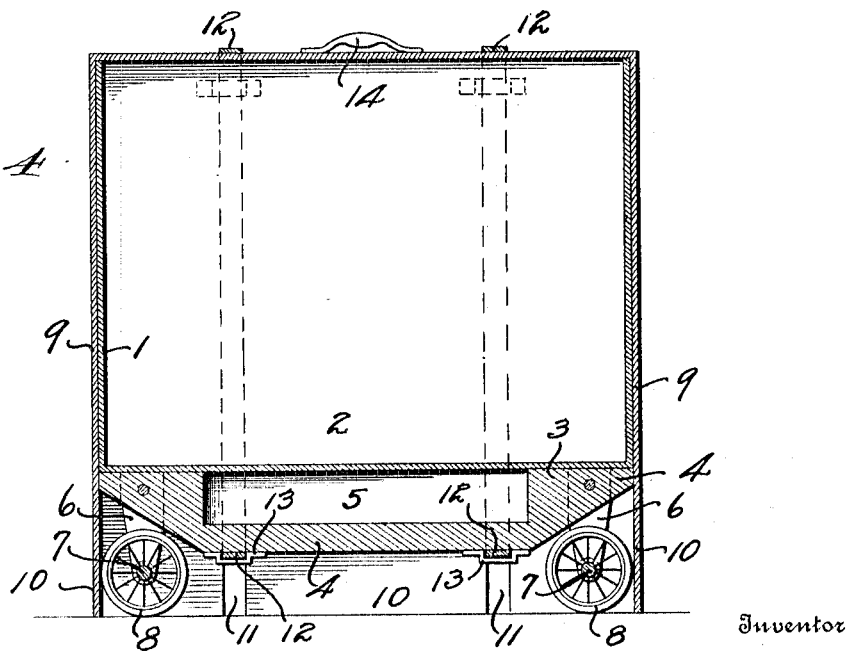

Figure 1 is a perspective view of a case constructed according to the present invention with the wheel base concealed. Fig. 2 is a side elevation of the construction shown in Fig. 1 with the cover raised and the wheeled base exposed. Fig. 3 is a vertical sectional view of the invention as shown in Fig. 2. Fig. 4 is a horizontal sectional view of the invention as shown in Fig. 1.

Similar reference characters designate corresponding parts throughout the several figures of the drawings.

The invention is illustrated in the accompanying drawings in connection with a "telescope," or that type of hand baggage wherein the body of the case is provided with a cover section that telescopes thereon. However, it will be understood that other types of luggage may be adapted to the present idea without departure from the invention.

Referring to the details of the illustrated embodiment, the numeral 1 designates the body part of the case, which is of suitable construction and provided with the interior compartment 2 for the storing of articles or samples. In accordance with the object of the invention to obviate the carrying of the weight of the packed case, the case body 1 is mounted on a wheeled truck or base, designated in its entirety by the numeral 3.

The body portion 4 of the truck 3 is preferably coextensive with the bottom of the case body 1, and may be provided with a top recess forming a storage chamber 5 for articles or samples in addition to those carried in the main compartment of the case body. Each end of the said body 4 of the truck is provided with suitable bearings 6 in which are mounted the axles 7 having thereon the wheels or rollers 8. In connection with the chamber 5 it will be observed that the case body 1 normally rests upon the top of the truck, so that the bottom wall thereof forms a cover for the chamber, thereby providing a safe storage compartment which increases the capacity of the case, and which is readily accessible upon removing the case body from the truck.

The case body 1 is provided with a telescoping cover section 9 whose vertical depth is greater than the depth of the said case body. Therefore, it will be obvious that when the top of the cover section rests upon the top edge of the case body or when the cover is in its lowered position, the lower sides and ends thereof will extend below the bottom of the case body and form a shield or skirt 10 which will entirely surround and form a housing which will conceal the wheeled truck 3. Further, in connection with the skirt portion 10 of the cover it will be noted that the same is provided in its sides with the clearance notches 11 which permit the straps 12 or other equivalent extensible members that engage with the cover to enter the strap guides 13 fixed to the underside of the truck body 4. Though the drawings show two straps for connecting the cover and truck, it will be fully understood that a single strap properly located will as effectively serve all of the purposes and functions of the two. Thus, it will be apparent that when the straps 12 are drawn tight the cover section is in its lowered position and the body of the case and the wheeled truck are held within the same so that the truck is entirely concealed within the skirt 10 and the entire case may be lifted by the handle 14 on the top of the cover section without danger of the truck being seen. The invention in this condition is clearly illustrated in Fig. 1 of the drawing. It is while in the closed position just referred to, and shown in Fig. 1, that the case may be carried on the coaches of railway trains and other places where wheeled objects are objected to and it is the only time that the weight of the case need be carried by the traveler. At other times when a case would ordinarily be carried along the walk or floor, it is only necessary to loosen the straps 12 so that the cover section 9 may be lifted sufficiently to expose the wheeled truck 3 so that it can roll upon the ground and thereby enable the traveler to push or pull the case along in the condition shown in Fig. 2. In this connection, it will also be noted that when the cover section is raised, the skirt 10, formed by the extension of the side and end walls of the cover section, will prevent the wheeled truck 3 from becoming longitudinally displaced from the bottom of the case member 1, because the said truck is preferably coextensive with the bottom of the body of the case, and the sides of the skirt will engage the truck and carry it along with anything supported thereby. The pull on the cover which is necessary to maintain the skirt in a raised position will draw the straps 12 taut so that the truck is held to the base.

From the foregoing description, it will be apparent that a novel method of transporting baggage has been devised, and one that is of special utility in connection with sample cases, though susceptible of minor changes which will render the invention applicable to a large variety of types of hand baggage.

I claim:

1. An article of baggage comprising a wheeled truck, a case seated on the truck and including a cover section having a skirt-portion adapted to extend over and conceal the truck, and extensible means for clamping the truck and case together.

2. An article of baggage comprising a wheeled truck, a case mounted upon said truck, a telescoping cover section for the case formed with a skirt portion adapted to extend and project below the bottom of said case and form a housing for the truck, and means for clamping the truck, case, and cover together.

3. An article of baggage comprising a wheeled truck, a case mounted upon said truck, a telescoping cover section for the case formed with a skirt portion adapted to extend and project below the bottom of said case and form a housing for the truck, and flexible extensible means for connecting the truck, case and cover so that the cover section may be raised to expose said truck.

4. An article of baggage comprising a wheeled truck having a storage compartment, a cover section adapted to telescope with the case body carried by the truck and extended to form the concealing skirt about said truck, and extensible means for connecting the cover and truck so that the former may be raised to expose the truck.

5. An article of baggage comprising a wheeled truck having a storage compartment, a cover section adapted to telescope with a case body carried by said truck and extended to project below the bottom of said case body to form a concealing skirt portion for the truck, said skirt portion being provided with clearance notches, and flexible extensible means for connecting the cover and truck so that the cover may be raised to expose the wheeled truck.

In testimony whereof I hereunto affix my signature in the presence of two witnesses.

JAMES G. WHITESIDE.

Witnesses:
AGNES A. JOHNSTON,
EDWARD E. MILLER.

Copies of this patent may be obtained for five cents each, by addressing the "Commissioner of Patents, Washington, D. C."